J. B. & F. D. SANNER
Boiler-Covering.
No. 204,455. Patented June 4, 1878.
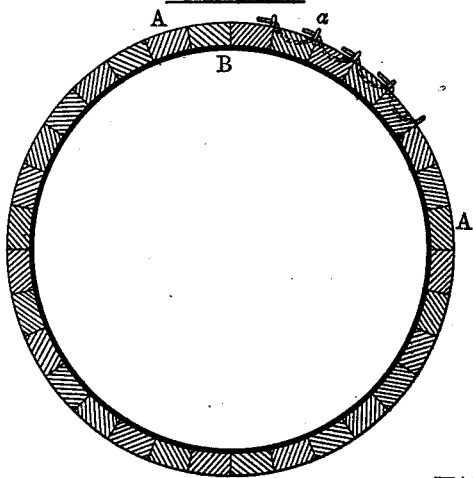
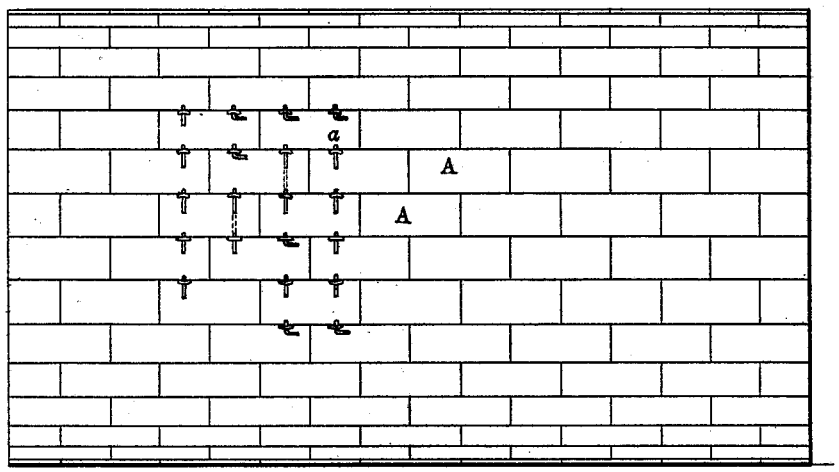
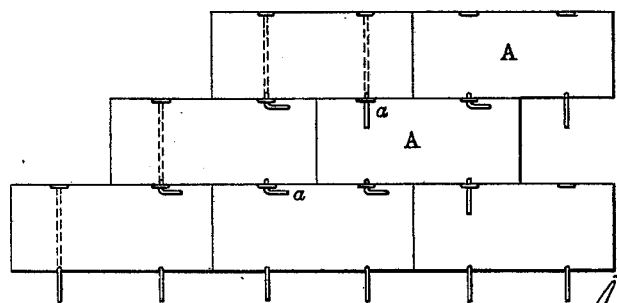

UNITED STATES PATENT OFFICE.

JAMES B. SANNER AND F. DAVID SANNER, OF BALTIMORE, MARYLAND.

IMPROVEMENT IN BOILER-COVERINGS.

Specification forming part of Letters Patent No. 204,455, dated June 4, 1878; application filed November 1, 1877.

*To all whom it may concern:*

Be it known that we, JAMES B. SANNER and F. DAVID SANNER, both of the city of Baltimore and State of Maryland, have invented certain Improvements in Heat-Retaining Coverings for Boilers, Steam-Pipes, &c., of which the following is a specification; and we do hereby declare that in the same is contained a full, clear, and exact description of our said invention, reference being had to the accompanying drawing, and to the letters of reference marked thereon.

This invention consists of a brick composed of any suitable heat-retaining substance, and provided with means for attachment to other similar bricks, a series of bricks thus constructed and connected forming a covering for boilers, pipes, &c.

In carrying out our invention, the bricks are preferably formed of several ingredients, combined in specified proportions, which composition is not claimed herein, but is reserved as the subject of a future application for Letters Patent.

In the description of the bricks and the manner of connecting them which follows reference is made to the accompanying drawing, forming a part hereof, and in which—

Figure 1 is a cross-section of an ordinary cylindrical boiler, showing our improved covering as applied thereto. Fig. 2 is a plan view of the same. Fig. 3 is an enlarged top view of a series of bricks, showing the manner of their connection.

Similar letters of reference indicate similar parts in all the views.

A A are bricks forming the main portion of the covering for the boiler B. The said bricks are connected by wires *a* molded therein, with their ends projecting from the bricks sufficiently to admit of their being hooked or twisted to the ends of similar wires in adjoining bricks, substantially as shown in the drawing.

The spaces between the bricks are preferably filled with a composition similar to that from which the bricks are made.

The advantage of using bricks instead of a continuous body of heat-retaining composition as a covering for boilers, &c., is that the bricks may be applied in a dry condition; and by using the wire attachments, as described, the bricks are self-sustained, and may be secured around a cylindrical body in a horizontal position without bands or other exteriorly-placed fastening appliances.

Having thus described our invention, what we claim as new, and wish to secure by Letters Patent of the United States, is—

As a new article of manufacture, a heat-retaining brick provided with means for attachment to other similar bricks, whereby a united series of said bricks forms a self-sustaining covering for boilers, pipes, &c., substantially as specified.

In testimony whereof we have hereunto subscribed our names this 28th day September, in the year of our Lord 1877.

JAS. B. SANNER,
F. DAVID SANNER.

Witnesses:
WM. T. HOWARD,
JNO. T. MADDOX.